United States Patent
Jennings et al.

(10) Patent No.: US 6,580,712 B1
(45) Date of Patent: Jun. 17, 2003

(54) SYSTEM FOR CONTROLLING LOOK-UPS IN A DATA TABLE IN A NETWORK SWITCH

(75) Inventors: Kevin Jennings, Dublin (IE); Christopher Hay, South Harrow (GB); Edele O'Malley, Dublin (IE); Gareth E Allwright, Watford (GB)

(73) Assignee: 3Com Technologies, Georgetown (KY)

( * ) Notice: Subject to any disclaimer, the term of this patent is extended or adjusted under 35 U.S.C. 154(b) by 0 days.

(21) Appl. No.: 09/415,235

(22) Filed: Oct. 12, 1999

(30) Foreign Application Priority Data

Dec. 19, 1998 (GB) ............................................. 9827911

(51) Int. Cl.⁷ ............................................. H04L 12/56

(52) U.S. Cl. ................................. 370/392; 370/395.31

(58) Field of Search ........................... 370/392, 395.31, 370/395.32, 401, 402

(56) References Cited

U.S. PATENT DOCUMENTS 5,708,659 A    1/1998    Rostoker et al.

FOREIGN PATENT DOCUMENTS

| EP | 0594196 | | 4/1994 |
|---|---|---|---|
| GB | 2346519 A | * | 9/2000 |
| WO | WO 97/36407 | | 10/1997 |
| WO | WO 98/29986 | | 7/1998 |
| WO | WO 99/000820 | | 1/1999 |

* cited by examiner

*Primary Examiner*—Salvatore Cangialosi
(74) *Attorney, Agent, or Firm*—Nixon & Vanderhye P.C.

(57) ABSTRACT

A system including an ordered data table containing linked lists of MAC addresses has a multiplicity of search engines which have their access to an LRU engine under the control of a token which is passed from one search engine to the next when the LRU engine has completed reordering the table after an address look-up. The system avoids conflicts between searching and reordering and allows reordering to be performed at a controlled rate.

3 Claims, 6 Drawing Sheets

SYSTEM FOR CONTROLLING LOOK-UPS IN A DATA TABLE IN A NETWORK SWITCH

FIELD OF THE INVENTION

This invention relates to the organisation and use of databases of addresses in network devices such as bridges or routers wherein address data obtained from a packet is employed in reduced form in order to look-up further address data required for the onward transmission of a packet.

The invention particularly relates to the management of look-ups in a switch which employs a hash table for the accessing of associated data including address data.

BACKGROUND OF THE INVENTION

Network devices (herein called switches) are generally required to obtain address data, which may be media access controlled data or network address data depending upon the type of switch. Generally, media access control (MAC) addresses i.e. layer 2 addresses in the OSI model, relate to the devices in the communication system and are generally used to perform bridging, that is to say switching packets from one port of a device to another. Network addresses, namely layer addresses in the OSI model, are commonly used for routing and generally direct a packet to another network or sub network. Nevertheless, a router may need to map a network address of, for example, an end station to its MAC address and to place the MAC address of the packet as the packet leaves the router. Furthermore, current network switches may perform both bridging and routing.

In particular, bridges need to respond to media access control (MAC) addresses to look up for example a relevant port mask whereas routers, in addition, may need to form a similar operation after a preliminary mapping, using an address resolution protocol, between a network address and a relevant media access control address.

In modern communication networks a media access control address is quite wide, normally having forty-eight bits. A network device must respond to a MAC address in order to access relevant associated data necessary for the onward transmission of a packet. It is not normally desirable to make provision for the storage of all possible MAC addresses and data associated with them and accordingly it is common practice to employ the address data in a reduced form, known as the hash table. A hash table is a table of addresses obtained by performing arithmetic operations on a MAC address. The operation may be, for example, an exclusive-OR function and normally reduces the width of the MAC address from typically forty-eight bits to ten or sixteen bits. The 'hashed' address constitutes a to pointer to a stored table, the entry in the stored table comprising the original MAC address and associated data such as, for example, port masks, VLAN identification and so on, depending on the requirements of the system.

It will be apparent that although a hash table is intended to be a sparsely populated table, so that a particular MAC address will map to a unique entry in the hash table which in tern maps to a single entry in the associated data table, the manner of generation of a hash table does not preclude the mapping of two, and often many more than two, MAC addresses to the same location in the hash table. When this occurs, the pointer of the hash table points to a first entry in the associated data table but the associated data table is organised so that that entry contains a pointer to another entry in which the MAC address can be represented by the same hash entry and so on. In this way a linked list of MAC addresses is built. The process of obtaining the data associated with an incoming MAC address is therefore to respond to the MAC address by recourse to the hash table, building the list of linked MAC address entries from the associated data table and examining this built list to find the MAC address which uniquely corresponds to the incoming MAC address. When the list of addresses becomes long, a longer time is necessary to find the correct MAC address in the list In order to speed up the search the list of addresses may be re-organised so that, for example, a MAC address found at the end of the list is moved one step forward up the list so that the next search for this MAC address will be faster. This adjustment of the order of the addresses is controlled by an algorithm known as a least recently used (LRU) algorithm and enables the most commonly used MAC addresses to be found more quickly than those that are less used.

At network speeds of 10 Mbps per second and 100 Mbps per second it has proved feasible to implement this form of look-up using a single search engine, i.e. that combination of hardware and software which responds to an incoming MAC address to access the hash table obtain the list of list addresses and search through them in a given order until a MAC address matching the incoming MAC address is found. At the end of a search performed by the single search engine the search would cease look-ups and move a MAC address up one place in the list. However, it is desirable particularly when operating at a higher data rate, such as 1000 Mbps, to employ a multiplicity of look-up engines which share the same database. Such look-up engines will be searching the hash table and the linked lists at the same time. It is desirable for a least recently used algorithm to be employed but since potentially two engines may be searching the same list of linked addresses it is not desirable for both engines to implement a least recently used algorithm at the same time and it is not desirable, and not feasible at gigabit speeds, to wait until all the look-up engines have stopped before the order of the extracted media access control addresses in a list can be changed.

Accordingly the general object of the invention is to provide a method of operating databases in these circumstances to enable more than one look-up engine to use the database while avoiding conflicting operation of least recently used algorithms and avoiding the cessation of look-ups while a least recently used algorithm is performed to alter the order of addresses in a linked list.

SUMMARY OF THE INVENTION

The invention is based on the use of a specific or dedicated engine to execute the algorithm. In a specific form of the invention, a token is passed around each look-up engine in turn allowing it to use the dedicated engine. Accordingly, no two look-up engines will attempt to update the associated data table at the same time. Furthermore, updates are prevented from occurring when to engines are searching the same linked list.

A further disadvantage which may occur in known practice is that (especially at high speeds) continuous alteration of the order of media access control addresses in the associated data table may occur so that excessive time is occupied in writing data to the random access memory which contains the associated data table. Using the present invention, the frequency of updates can be limited by the dedicated engine to a selected rate which will normally ensure that the most common media access control addresses are at the top of the list.

DETAILED DESCRIPTION

Figure 1:
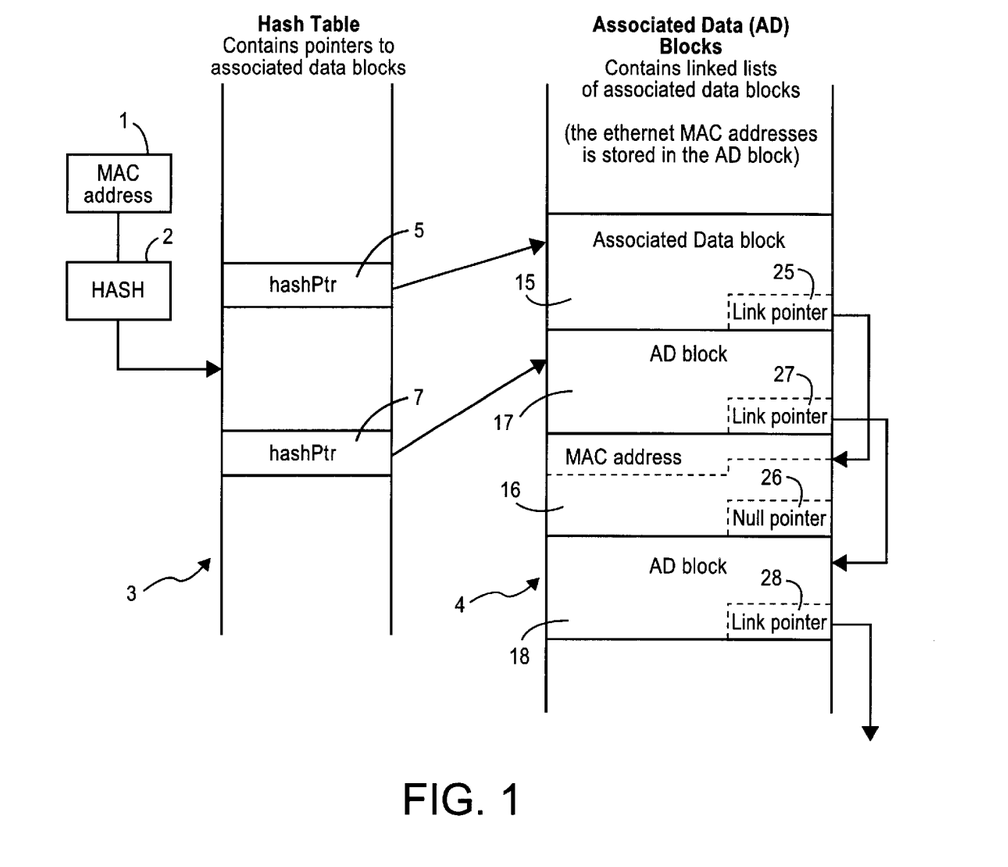
FIG. 1 is a drawing illustrating a hash table structure.

FIG. 1 illustrates part of a random access memory which forms part of a switch intended for use in a packet-switched data communication system, for example working according to an Ethernet standard at an operating rate of, for example, 1000 Mbps. However, the specific example is not limiting; the invention is capable of use at lower of higher rates and in system other than Ethernet systems. It is however assumed that the switch receives data packets including a header which includes address data. Further, the switch includes, in accordance with known practice, means for extracting or deriving a media access control address (MAC address) from the address data in the packet. The packet may provide the MAC address directly; but the MAC address may be obtained from a network (layer 3) address by means of an address resolution protocol. In any event, it is assumed by way of introduction to FIG. 1 that examination of the data packet has yielded a MAC address which will be used to obtain some associated data, such as a port mask, which will enable the network switch to direct the packet to an output port connected directly or indirectly to the device associated with that media access control address.

FIG. 1 therefore shows a MAC address 1 which is subject to hashing 2 to produce an entry in a hash table 2. This table and an associated data table 4 are physically located in respective sections of a memory, normally a static random access memory.

The hashing of the input MAC address is effected by means of a hashing algorithm which may for example consist of a set of exclusive or operations and which reduces the width of the MAC address from its normal length, such as forty-eight bits, to a much shorter word, such as ten to sixteen bits. This operation greatly reduces the amount of storage space required in the random access memory. Nevertheless, it will be obvious that for any particular hashed address there will be at least potentially a multiplicity of MAC addresses.

Each of the hash addresses is in essence a pointer to an entry in a data table. Each of the entries in this data table includes an MAC address, other associated data such as port mask data, and in general a pointer to another entry in the associated data table. The pointer will point to the next entry in a list of MAC addresses which all map to the same entry in the hash table. Such a list is originally compiled by, for each incoming MAC address, performing a hashing operation on it to obtain the hash pointer entry, accessing the associated data table and performing one or other of the following operations, namely:

(i) making an entry in the data table at the location determined by the hash pointer, or (ii) having determined that an entry in the data table corresponding to the hash pointer already exists, making an entry in the next available space in the data table and identifying the location of this entry by a link pointer in the previously stored table entry.

In this way, MAC addresses which map to the same hash table entry are connected together in a chain and in a readout phase, readout of a list under the control of a hash pointer will cause readout or examination of the entries in the associated data table in the order in which they appear in the list.

FIG. 1 illustrates a first hash pointer 5 which points to an associated data block 15 which contains a link pointer 25 to an associated data block entry 16. In this example, the entry 16 is the last in the list associated with hash pointer 1 and accordingly its pointer 26 is set to 'null'. FIG. 1 also illustrates a second hash table entry 7 which points to an associated data block 17 of which the link pointer 27 points to the fourth data block 18 of which the link pointer 28 points to some other block elsewhere in the associated data table.

Figure 2:
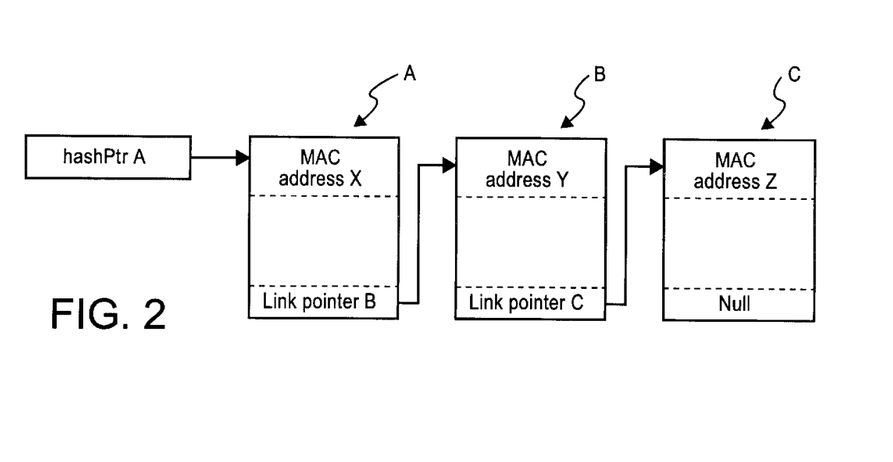
FIG. 2 illustrates a linked list of MAC addresses.

FIG. 2 illustrates a chain of entries in the associated data table and the respective hash pointer. In this example hash pointer hash ptrA points to location A containing a MAC address X and a link pointer P which points to storage location B containing MAC address Y and link pointer C pointing to location C containing MAC address Z and also a null pointer since this entry is the last in the list.

In response to an incoming MAC address the switch will cause the hashing of the incoming MAC address, in this example to produce hash pointer A which causes a search engine to examine in turn the MAC addresses X, Y and Z for correspondence with the incoming MAC address The operation of the least recently used algorithm may be understood as follows. If the search engine detects for example that MAC address Z corresponds to the MAC address on the incoming packet, the location of MAC address Z and MAC address Y in the associated data table are interchanged so that MAC address Z and the associated data are in location B and MAC address Y and its associated data are in location C Thus on the next occurrence of a packet containing MAC address Z, MAC address Z will be found earlier than before. The process of re-ordering of the stored addresses in the associated data table tends to a state in which the most common addresses occur earlier. In the simple example given above, if each look-up engine performs the least recently used algorithm, then one engine might be attempting to swap MAC address Y with MAC address X while a second look-up engine is attempting to swap MAC address Y with MAC address Z on the assumption that the first look-up engine is detecting packets with MAC address Y and the second look-up engine is detecting packets with MAC address Z. It is not desirable to wait until all look-up engines have stopped before changing the order of the addresses in a link list.

Figure 3:
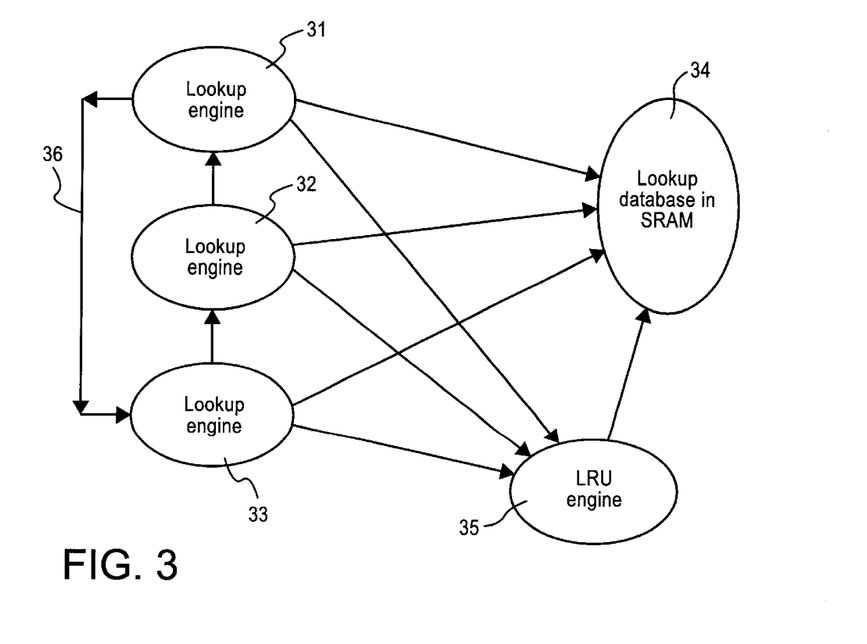
FIG. 3 is a schematic illustration of the invention.

FIG. 3 illustrates schematically the concept of the present invention. FIG. 3 illustrates a plurality of look-up engines 3 each of which may, for example, associated with a respective input port on the switch. Each of the look-up engines can perform a look-up in the database 34 established in the static random access memory. In addition to the look-up engines is a further LRU engine 35 which will perform the change in order of the entries in a linked list in the associated data table. Thus if look-up engine 31 has found MAC address Y then after verification of this address MAC address Y is passed to the LRU engine which locates the MAC address immediately before it in the linked list and interchanges the two. Further, the look-up engines 31–33 are interlinked (preferably under software control) so that only one at any given time has access to the LRU engine. For this purpose the look-up engines may be controlled by a 'token' 36 which is passed from engine to engine in cyclic sequence, each look-up engine performing a search and then surrendering the token to the next engine.

This scheme has the advantage that only one algorithm is performed at any one time. Furthermore, re-ordering of the entries in the associated data table can be controlled to be at a selected rate.

Further the look-up engines 31–33 are interlinked in hardware so that only one at any given time has access to the LRU engine. For this purposes the look-up engines may be controlled by a 'token' 36 which is passed from engine to engine in cyclic sequence, each look-up engine performing a search and then surrendering the token to the next engine.

The process by which a token is passed from one engine to the next is as follows.

When the packets are passing through the system, each look-up engine will be receiving 'look-up requests' (requests to perform a search in the look-up database in SRAM) independently at arbitrary time periods. At every system clock tick a look-up engine, if it has received a 'look-up request', will request an LRU token and gain control of the LRU engine resource. The look-up engine will hold on to the token until it has completed searching the look-up database. During the search the LRU engine will keep a copy of three link pointers which are used to perform a swap if needed. For instance in FIG. 3, if MAC address Y was being searched for then the LRU engine would keep a copy of 'hashPtrA', 'link pointer B' and 'link pointer C'. When the search is completed the LRU engine will write link pointer B into hashPtr A's location, link pointer C into link pointer B's location and hashPtr A into link pointer C's location. This is a total of three writes by the LRU engine into the look-up database. Once the LRU engine has completed this operation it will signal back to the look-up engine that it has completed the swap and this look-up engine must now pass the token to the next look-up engine.

If a look-up engine has a token but no 'look-up request', then the token is held onto until a look-up request is received or if an elapsed period of time expires. This period of time is the same as the rate at which swaps are to be performed (mentioned below). This guarantees that each look-up engine gets fair access to the LRU engine resource.

If a look-up engine receives a token but it has already started its search then the token is held onto until the next look-up request is received or if an elapsed period of time expires. This period of time is the same as the rate at which swaps are to be performed.

If excessive swapping of MAC addresses occurs then the look-up performance will diminish. Therefore as an addition to LRU can also be set up to perform swaps at a defined rate. The LRU scheme tunes a look-up database over time so as the most frequently used MAC addresses move to the start of the linked lists. To achieve this it may be sufficient to perform swaps at only one percent of the look-up rate. This can be implemented by adding a counter to the LRU engine to limit the rate of swaps.

A requirement for this scheme to work is that the LRU engine must not perform an LRU update on a linked list if any other look-up engine is searching the same linked list for a MAC address. Therefore each look-up engine must indicate to the LRU engine if it is performing a search and the list that it is searching. If this condition occurs the LRU engine will not perform the swap, but the token will be passed to the next look-up engine.

Figure 4:
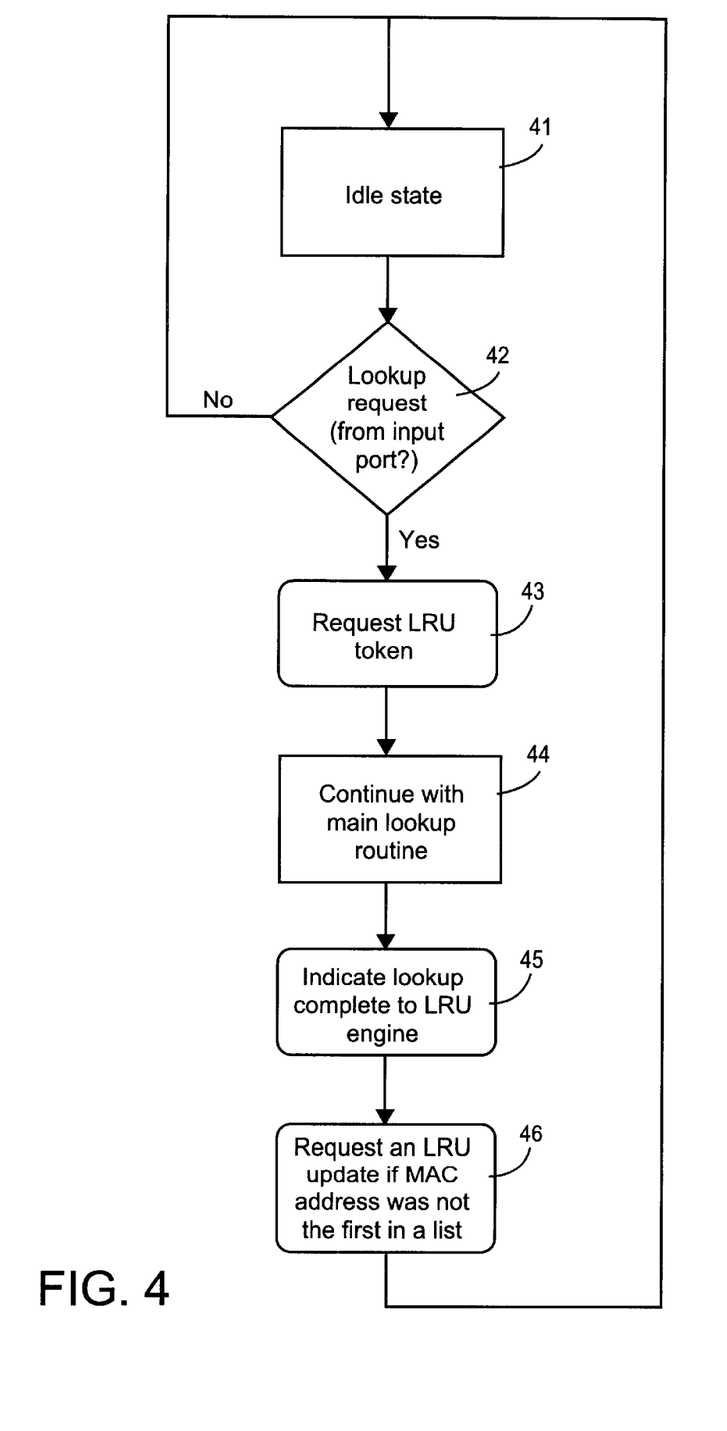
FIG. 4 is a flow diagram of the operation of a search engine.

FIG. 4 is a flow diagram of the operation of any of the search engines. From an idle state 41 the search engine determines (state 42) whether a look-up request has been made. If no such request is present for that search engine, the engine reverts to its idle state. If a lookup request is present, the search engine requests the LRU token (state 43) and continues with a main look-up routine (state 44). When the look-up routine is complete, the completion is signaled to the LRU engine (state 45) and a request is made (state 46) to update the order of the address list if the MAC address located by the search engine was not the first in the list.

Figure 5:
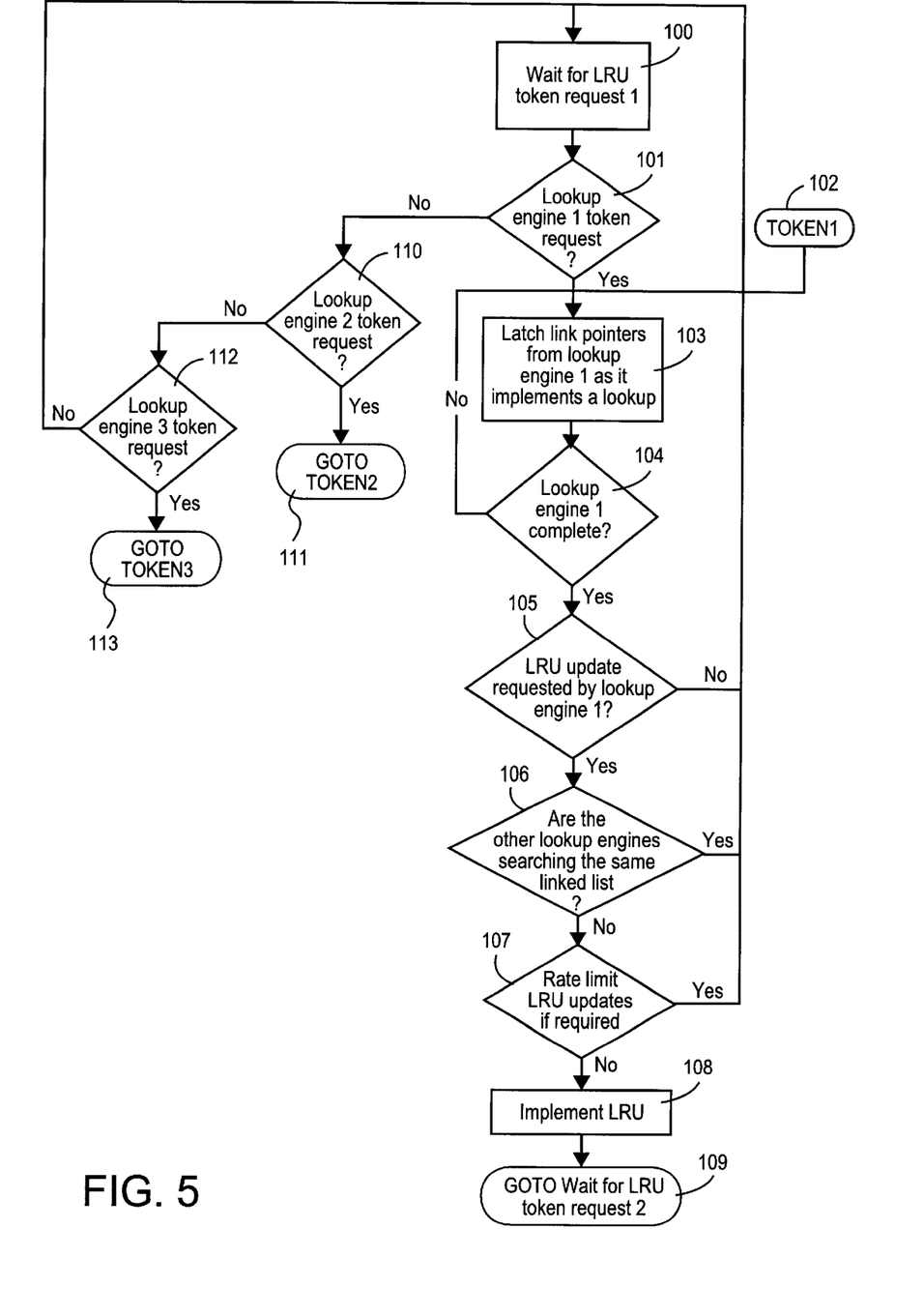
FIGS. 5, 6 and 7 are flow diagrams of the operation of the LRU engine and a token which controls access to the LRU engine for the search engines.
Figure 6:
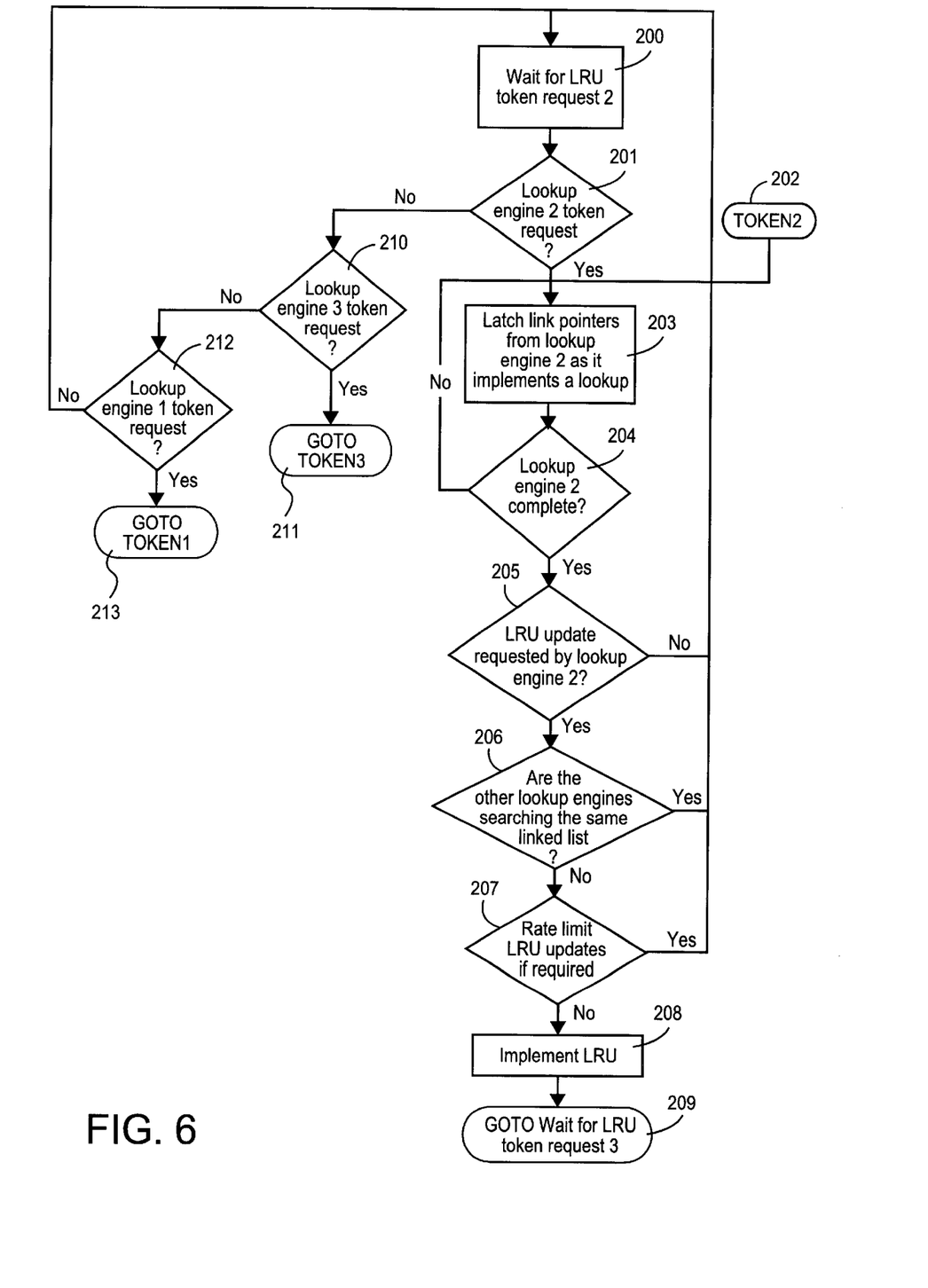
Figure 7:
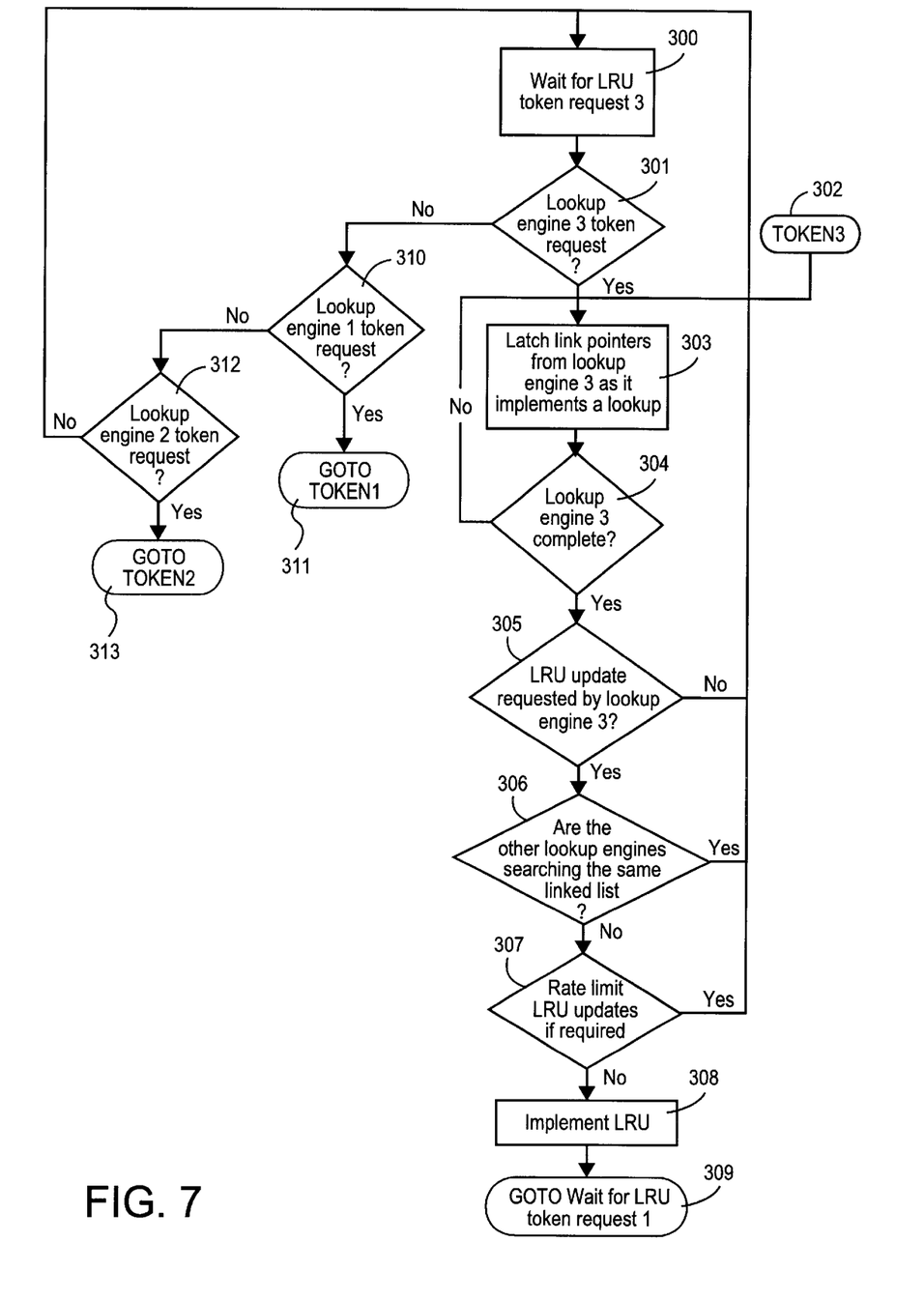

FIGS. 5 to 7 illustrate the operation of the LRU engine and the token system. Each of the Figures is similar and represents the operation of the LRU engine in relation to primarily a respective look-up engine.

In FIG. 5, the state 100 indicates that the engine is waiting for a token request from the first look-up engine. State 101 determines whether a token request from the first look-up engine is current. If it is, then token 1 is established (state 102). Furthermore, as indicated by state 103, the link pointers from the look-up engine are latched while the look-up engine implements a look-up. State 104 determines whether the look-up performed by the first engine is complete. If the look-up is not complete, the process reverts to state 103. State 105 determines whether an LRU update has been requested by the first look-up engine. If not, the next state is the waiting state 100. If the LRU update has been requested by the first look-up engine, there is a determination (state 106) whether the other look-up engines are searching the same linked list. If this determination is affirmative, there is a reversion to the waiting state 100. If the other look-up engines are not searching the same linked list, there follows a determination, state 107, whether to inhibit an LRU update if performance of the LRU update would exceed a predetermined rate limit. Otherwise the LRU is implemented, state 108 and finally there is a GOTO instruction, state 109, to wait for a token request2. If a state 101 there is no token request from engine 1; there is a determination, state 110, whether there is a token request from engine 2. If there is, the next state 111 is to go to token 2. Further, if there is no token request from the second engine there is a determination, state 112, whether there is a token request from the third engine. If there is then the next state 113 is to go to token 3. If there is no such token request the LRU engine reverts to state 100.

The flow diagrams in FIGS. 6 and 7 exactly correspond to that in FIG. 5. Corresponding states in the three Figures are denoted by reference numerals incremented by 100, so that states 201 and 301 each correspond to state 101 expect that they are examining look-up requests for engine 2 and engine 3 respectively. Thus the above description relative to FIG. 5 applies to the respective engines and the Figures together define a cyclic process wherein an LRU algorithm will not be performed if any other lookup engine is searching the same linked list and the completion of an LRU algorithm in respect of any of the look-up engines then enables the passing of the token. The token is constituted by the states 102, 202 and 302.

What is claimed is:

1. A system for performing address look-ups in an ordered data table within a switching device for a packet-based communication network, the data table containing entries which are in a defined searchable order and each include a media access control address, some of said entries each containing a respective pointer to another entry in the data table, the system comprising:

a multiplicity of look-up engines for performing a look-up to locate an address in said data table;

an LRU engine which is accessed by any of the look-up engines and is operative, in response to the location of an address in the table, to reorder the data table in accordance with a least recently used algorithm; and a token-based control for the look-up engines, said control including a token which is passed from look-up engine to look-up engine and allows only a look-up engine which is in possession of the token to access the LRU engine and thereby cause reordering of said data table.

2. A system according to claim 1 wherein said LRU engine controls the passage of the token from one look-up engine to another to occur after a reordering of the data table.

3. A method of performing address look-ups in an ordered data table within a switching device for a packet-based communication network, the data table containing entries which are in a defined searchable order and each include a media access control address, some of said entries each containing a respective pointer to another entry in the data table, the method comprising:

operating a multiplicity of look-up engines to perform look-ups to locate addresses in said data table;

operating an LRU engine, in response to the location of an address in the table, to reorder the data table in accordance with a least recently used algorithm;

operating a token-based control for the look-up engines, including passing a token from look-up engine to look-up engine and allowing only a look-up engine which is in possession of the token to access the LRU engine and thereby cause reordering of said data table; and controlling by means of said LRU engine the passage of the token from one look-up engine to another to occur after a reordering of the data table.

* * * * *